US012734881B2

(12) United States Patent
Iliffe-Moon

(10) Patent No.: US 12,734,881 B2
(45) Date of Patent: Sep. 15, 2026

(54) INTERACTIVE CONTROL FOR A VEHICLE

(71) Applicant: Bayerische Motoren Werke Aktiengesellschaft, Munich (DE)

(72) Inventor: Etienne Iliffe-Moon, Menlo Park, CA (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 26 days.

(21) Appl. No.: 18/846,491

(22) PCT Filed: Feb. 16, 2023

(86) PCT No.: PCT/EP2023/053825

§ 371 (c)(1),
(2) Date: Sep. 12, 2024

(87) PCT Pub. No.: WO2023/186397

PCT Pub. Date: Oct. 5, 2023

(65) Prior Publication Data

US 2025/0214425 A1 Jul. 3, 2025

(30) Foreign Application Priority Data

Apr. 1, 2022 (DE) ..................... 10 2022 107 809.4

(51) Int. Cl.
*B60K 35/21* (2024.01)
*B60K 35/26* (2024.01)
(Continued)

(52) U.S. Cl.
CPC ............ *B60K 35/21* (2024.01); *B60K 35/265* (2024.01); *G06T 13/40* (2013.01); *G06V 40/174* (2022.01); *G06V 40/28* (2022.01)

(58) Field of Classification Search
CPC ...... B60K 35/21; B60K 35/265; G06T 13/40; G06V 40/174; G06V 40/28; G06F 3/167
See application file for complete search history.

(56) References Cited

U.S. PATENT DOCUMENTS

2008/0119994 A1* 5/2008 Kameyama ........... B60W 40/08 701/1
2011/0083075 A1 4/2011 MacNeille et al.
(Continued)

FOREIGN PATENT DOCUMENTS

DE 10 2007 053 470 A1 5/2008
DE 10 2010 040 818 A1 4/2011
(Continued)

OTHER PUBLICATIONS

International Search Report (PCT/ISA/210) issued in PCT Application No. PCT/EP2023/053825 dated May 23, 2023 with English translation (6 pages).
(Continued)

*Primary Examiner* — Richard M Camby
(74) *Attorney, Agent, or Firm* — Crowell & Moring LLP

(57) ABSTRACT

A system for controlling a digital assistant on board a vehicle for interacting with a person by way of speech includes an input device for optically scanning the person; an output device for displaying a visual impression of the assistant; and a processing device designed to control the digital assistant in such a way that the digital assistant expresses an emotion depending on an emotion of the person.

13 Claims, 4 Drawing Sheets

(51) Int. Cl.

| | |
|---|---|
| ***G06T 13/40*** | (2011.01) |
| ***G06V 40/16*** | (2022.01) |
| ***G06V 40/20*** | (2022.01) |

(56) References Cited

U.S. PATENT DOCUMENTS

| | | | | |
|---|---|---|---|---|
| 2011/0093158 A1* | 4/2011 | Theisen | G06F 9/453 | 701/29.5 |
| 2015/0199967 A1* | 7/2015 | Reddy | G10L 25/30 | 704/249 |
| 2019/0325864 A1* | 10/2019 | Anders | G10L 15/19 | |
| 2020/0285698 A1* | 9/2020 | Azevedo | G10L 15/18 | |
| 2022/0189093 A1* | 6/2022 | Xiao | G06N 3/0464 | |
| 2024/0402989 A1* | 12/2024 | Zhang | G06F 3/011 | |

FOREIGN PATENT DOCUMENTS

| | | |
|---|---|---|
| DE | 10 2011 013 777 A1 | 11/2011 |
| DE | 10 2015 203 875 A1 | 9/2016 |
| WO | WO 2021/077737 A1 | 4/2021 |

OTHER PUBLICATIONS

German-language Written Opinion (PCT/ISA/237) issued in PCT Application No. PCT/EP2023/053825 dated May 23, 2023 with English translation (10 pages).

German-language Search Report issued in German Application No. 10 2022 107 809.4 dated Jan. 31, 2023 with partial English translation (12 pages).

* cited by examiner 305
310
315
320
325
330
335
340
345

INTERACTIVE CONTROL FOR A VEHICLE

BACKGROUND AND SUMMARY

The present invention relates to the interactive control of a vehicle. In particular, the invention relates to a dialog between a person on board a vehicle and a digital assistant of the vehicle.

A vehicle comprises a plurality of simple and complex functions which can be functionally interconnected. For the purpose of controlling the vehicle, a digital assistant can be provided which identifies or implements an action desired by a person. By way of example, a structure of entries in a menu can be dynamically adapted to a person's habits. It is also possible to guide the user through a menu structure or a decision tree with the aid of a dialog.

It has been proposed to implement an output of a digital assistant on board a vehicle by way of natural language. The person can likewise express himself or herself using natural language such that they can enter into a dialog with the digital assistant. The functions on board the vehicle can thus be controlled by the person in an improved manner.

Despite a linguistic dialog capability, the digital assistant may be perceived as impersonal or bureaucratic by the person. Particularly when the person is controlling the vehicle, they may for various reasons be subjected to emotions which may influence their action and also their manner of communication. A customary interactive system on board a vehicle may have difficulties in determining an intention of the person or in providing an output that is easily taken in by the person.

An object on which the present invention is based consists in specifying an improved technique for interactively controlling a vehicle. The invention achieves this object by the subjects of the independent claims. Dependent claims present preferred embodiments.

According to a first aspect of the present invention, a system for controlling a digital assistant on board a vehicle for interacting with a person by way of speech comprises an input device for optically scanning the person; an output device for outputting an optical impression of the assistant; and a processing device configured to control the digital assistant in such a way that the latter expresses an emotion depending on an emotion of the person.

The digital assistant may also be called an interactive digital assistant (IDA), and is usually realized in the form of a computer program. The digital assistant is configured to react to an input from the person and to provide an output to the person. Moreover, the assistant can control a function on board the vehicle. This generally involves attempting to equip the digital assistant with at least some human characteristics, attributes or capabilities, such that the assistant can assist the person like a human at least in some aspects. By way of example, the interaction with the person can take place by way of speech in one direction or in both directions.

In order to provide an optical impression of an emotion of the digital assistant, a human or a portion of a human can be represented, for example in a realistic, stylized, abstract or metaphorical manner. The representation can be animated, such that it can show attentiveness toward the person, for example. It is particularly preferred for the emotion to be expressed while the person is speaking, or is directing a linguistic input to the digital assistant.

It is furthermore preferred for the emotion of the digital assistant to follow the emotion of the person. If the person is speaking with the digital assistant in a serious manner, for example, then the digital assistant can output a serious emotion; an output of the digital assistant can be provided in a serious manner. It is possible, in an improved manner, for the person to gain the impression that their linguistic utterance is correctly taken in or implemented by the digital assistant. Signs of emotions that accompany practically every utterance of a human can easily be captured and reproduced by the digital assistant. The person can thus acquire a feeling of empathy from the digital assistant.

While the digital assistant essentially implements one or more control functions, hereinafter a representation presented on the output device is likewise referred to as digital assistant. This representation can concern in particular a human, a humanoid or some other entity.

In one embodiment, the digital assistant comprises a face and the processing device is configured to control the digital assistant in such a way that an expression of the latter's face follows an expression of the face of the person. The expression of the face of the person can be divided into individual elements. By way of example, positions of the eyebrows, a shape of the mouth or shape or movements of the eyes can each be individually reflected by corresponding elements of the digital assistant's face. In this case, the digital assistant need not replicate the person's movements, but rather can use the observed elements as stylistic devices of an overall impression.

In a further embodiment, the digital assistant comprises limbs, wherein the processing device is configured to control the digital assistant in such a way that the latter's limbs follow a pose or a gesture of limbs of the person.

A pose or a posture of the person can be observed well particularly if the person maintains a certain distance from the operating elements of the vehicle. This can be the case for example for a partially or completely automatically controlled vehicle. In this regard, for example, crossed legs or folded arms may in each case indicate an emotion of the person. The digital assistant can use corresponding poses or gestures as stylistic devices for expressing a corresponding emotion.

In a further embodiment, the processing device is configured to determine a first emotion of the person on the basis of the optical scanning; to determine a second emotion on the basis of the first emotion; and to control the digital assistant to express the second emotion.

The decoupling of the first emotion from the second emotion makes it possible, in an improved manner, for different stylistic elements to be employed by the person and the digital assistant in each case for expressing an emotion. Moreover, the second emotion can be decoupled from the first emotion in a predetermined manner. By way of example, the second emotion can follow the first emotion with a time delay.

The processing device can be configured to determine a difference between the first emotion and a predetermined normal emotion on a predetermined scale and to determine the second emotion in such a way that the latter follows the first emotion on the scale only as far as a predetermined distance from the normal emotion.

In this regard, the digital assistant can adhere to a limited repertoire of emotions so that it cannot be perceived as overly emotional by the person. In particular, it is possible to prevent an emotion expressed by the digital assistant from adversely affecting a support that the function of the digital assistant is intended to provide for the person. Moreover, in an emotionally charged situation, the person can be prevented from being additionally burdened by an emotion of the digital assistant. By way of example, an excessive increase in the person's anger, sadness or fear can be prevented.

The normal emotion can be perceived as neutral or expressionless. In one embodiment, the normal emotion can be found as a midpoint on the predetermined scale. An emotion expressed by the person or the digital assistant can be on a plurality of different scales. By way of example, it is possible to be simultaneously happy and angry. The emotion expressed by the digital assistant can follow the person's emotions to different extents on the different scales. By way of example, the digital assistant can follow a happy emotion to a further extent than a furious emotion. A relationship between the first and second emotions can be predetermined by the person in the form of a user preference.

In a further embodiment, the second emotion can complement the first emotion on the predetermined scale. By way of example, the emotion of the digital assistant can express gentleness if the person expresses aggressiveness. Various transitions to the aforementioned embodiment are possible here. By way of example, an emotion expressed by the digital assistant can follow an emotion of the person as far as the predetermined distance and develop back from there. The development back can extend to the complementary side of the emotion. It is thus possible in particular to work toward the person remaining within a delimited framework of emotions with respect to the normal emotion. If the person is the driver of the vehicle, the person's ability to concentrate or decision-making ability can thus be ensured in an improved manner.

The processing device can be configured to define a predetermined emotion as second emotion if the determination of the first emotion is unsuccessful or is not unambiguous. The predetermined emotion can express friendliness, interest and/or attentiveness, for example. In one embodiment, the predetermined emotion corresponds to the normal emotion.

The system can have an interface to an interior lighting system, wherein the processing device is configured to control the interior lighting system in such a way that the latter supports the second emotion. If the digital assistant expresses rage as an emotion, for example, then the interior lighting can be illuminated in reddish colors, relatively brightly or in a flickering manner. If the digital assistant is intended to radiate calmness in a further example, then the interior lighting can be illuminated in a deep blue in a constant manner and with medium to low brightness. The interior lighting can thus be used as an additional way of conveying the emotion of the digital assistant to the person. In a similar manner, other controllable elements on board the vehicle can be used for supporting the expressed emotion. By way of example, an entertainment system or a communication system can be correspondingly controlled for this purpose.

Preferably, the digital assistant is configured to recognize a linguistic utterance of the person and to provide a spoken output depending on the utterance. In this regard, the digital assistant can conduct a dialog or act bilaterally with the person. The emotion of the assistant can also be expressed by the spoken output being adapted. By way of example, a tone, speed or pitch of the spoken output can be adapted for expressing the emotion.

The utterance can concern a vehicle state or a driving state of the vehicle. The digital assistant can carry out a function that concerns the vehicle state or the driving state of the vehicle. In this case, information can be provided to the person or an intervention in the respective control can be carried out.

In one particularly preferred embodiment, the digital assistant is configured to control a vehicle function in response to the utterance. The vehicle function can comprise for example setting a destination location for vehicle navigation, or changing the interior lighting or a lane that is preferably to be used.

According to a further aspect of the present invention, a vehicle comprises a system described herein. The vehicle can comprise in particular a motor vehicle, for example an automobile, a motorcycle, a truck or a bus. The vehicle can be configured to be partially or autonomously controlled.

According to yet another aspect of the present invention, a method for controlling a digital assistant on board a vehicle for interacting with a person by way of speech comprises steps of optically scanning the person and outputting an optical impression of the digital assistant. In this case, the digital assistant is controlled to express an emotion depending on an emotion of the person.

The method can be performed by a system described herein. For this purpose, the system can comprise a processing device comprising a programmable microcomputer or microcontroller, for example. The method can be present in the form of a computer program product with program code. The computer program product can also be stored on a computer-readable data carrier. Features or advantages of the system can be applied to the method, or vice versa.

For execution purposes, the computer program product generally requires an execution environment that usually comprises a processing device, a first data memory for holding the computer program product, a second data memory for holding a processing result, a first interface for providing information to be processed, and a second interface for outputting processed information. The processing device usually operates in a clocked manner and can comprise an appropriate clock generator. The processing device, the data memories and the interfaces can each be realized using semiconductors. For supplying the semiconductors with energy, an electrical energy source or an interface for connection to an electrical energy supply can be provided.

The computer program product can run within the scope or with the aid of a management program running on the execution environment, which management program may also be called an operating system. In the present case, in particular, the system can comprise or provide a computer-based execution environment.

The invention will now be described in more specific detail with reference to the accompanying drawings.

DETAILED DESCRIPTION OF THE DRAWINGS

Figure 1:
FIG. 1 illustrates a system on board a vehicle.
Figure 1:
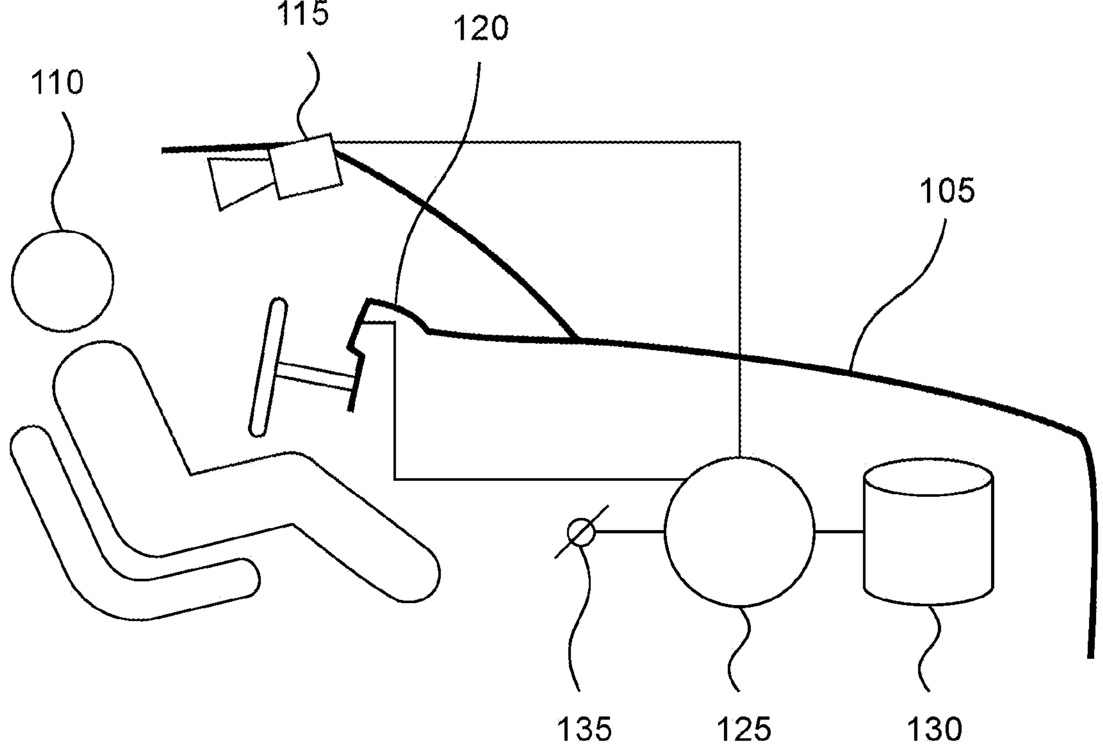

FIG. 1 shows a system 100 on board a vehicle 105. The system 100 is configured to interact with a person 110 on board the vehicle 105. The system 100 comprises an input device 115, an input device 120 and a processing device 125. A data memory 130 and/or an interface 135 can optionally be provided.

The input device 115 is configured for optically scanning the person 110 or a section of the person. For this purpose, the input device 115 can comprise a camera, for example an interior camera of the vehicle 105. It is also possible to use a plurality of cameras 115 which can operate from different perspectives, with different focal lengths and/or different wavelength ranges.

In a further embodiment, the input device 115 also comprises a microphone for capturing a linguistic utterance of the person 110.

The output device 120 is configured to provide an optical output for the person 110. For this purpose, the output device 120 can comprise in particular a screen or a projector. An acoustic output can likewise be supported. In a further embodiment, the output device 120 is wirelessly connected to the vehicle 100 or one of the systems thereof. In this case, the output device 120 can be comprised by a mobile device such as a smartphone.

The processing device 125 is preferably designed as a control unit on board the vehicle 105 and can comprise a processing device. The data memory 130 can comprise user-definable presettings, a repertoire of recognizable emotions or emotions to be provided or a history of captured emotions of the person 110.

The interface 135 can be connected to another system or subsystem on board the vehicle 105 and serve for obtaining information or the control of a vehicle function. In one embodiment, for example, interior lighting of the vehicle 105 can be controlled via the interface 135. In another embodiment, for example, a driving function of the vehicle 105, comprising longitudinal and/or lateral control of the vehicle 105, can be influenced, for example by stipulation of a travel destination or alteration of a desired driving speed. The information can also give a further indication of an emotion of the person 110, for example by virtue of it reflecting a pulse rate or a frequency of the blinking of the person 110. Such scanning can be effected by way of an optical sensor or some other sensor on board the vehicle 105.

The system 100 can realize a digital assistant for controlling the vehicle 105 by way of linguistic interaction with the person 110. It is proposed to design the system 100 to control a visual representation of the digital assistant on the output device 120 in such a way that the digital assistant expresses a predetermined emotion. This emotion is intended to be derived in particular from an emotion which was recognized during the interaction from the person 110 on the basis of scanning by way of the input device 115.

Figure 2:
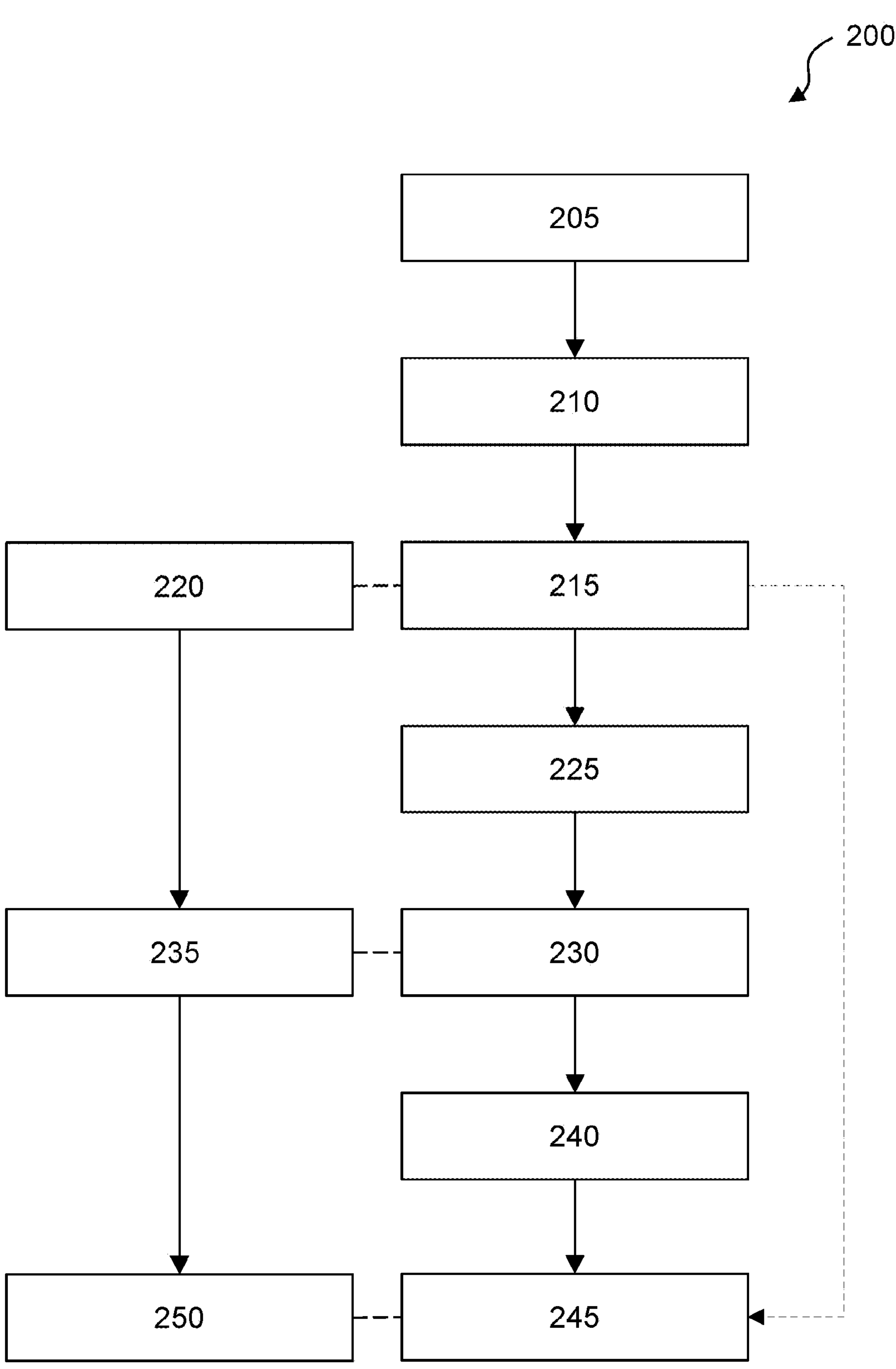
FIG. 2 illustrates a flow diagram of a method.

FIG. 2 shows a flow diagram of an exemplary method 200. The method 200 can be performed in particular with the aid of a system 100.

In a step 205, an interior of the vehicle 105 can be recorded. An optical input device 115 such as a camera can be used for this purpose. In a step 210, a person 110 in the interior of the vehicle 105 can be captured. If there are a plurality of persons 110 in the interior, then it is possible to select one person who interacts with the digital assistant of the system 100.

In a step 215, the chosen person 110 can be optically scanned. For this purpose, in particular, a face, optionally a torso or further optionally the entire person can be optically scanned. Individual elements of the person 110 can be recognized on the scan and put into context with one another. By way of example, positions of limbs of the person 110 can be captured and a resultant posture or gesture can be determined. The scanning can be effected in particular while an acoustic input from the person 110 is captured in a coordinate step 220.

Steps shown on the left in the illustration in FIG. 2 concern a functionality of a digital assistant, while steps shown on the right are assigned to the emotional assistance presented herein.

In a step 225, a first emotion of the person 110 can be determined on the basis of the optical scanning. The emotion can be determined in particular on the basis of a pose, a gesture, a facial expression and/or a way of speaking. In a step 230, the determined emotion can be placed in context with the linguistic utterance of the person 110. For this purpose, in a step 235, the acoustic input from the person 110 can be processed and in particular understood. Optionally, in the step 230, even further information such as, for example, a driving state, a journey destination or a number of persons 110 situated on board can also be determined.

In a step 240, a second emotion can be determined on the basis of the determined first emotion and the further determined information. The second emotion can follow the first emotion, i.e. be modeled thereon, or be configured to counteract the first emotion, i.e. to complement the latter. In a further embodiment, the second emotion can be shifted relative to the first by a predetermined magnitude on a predetermined scale. In this regard, the second emotion can for example always be friendlier or calmer by a certain amount. In this regard, the digital assistant can predominantly be perceived as positive or open-minded. The shift in the second emotion relative to the first can also be determined in terms of magnitude or scale with respect to a prevailing situation or a driving state of the vehicle. Both the first emotion and the second emotion can concern a superimposition of different emotions lying on different scales, as will be explained in even more specific detail below.

In a step 245, the interactive digital assistant can be controlled to express the predetermined second emotion. This can be done while the person 110 is speaking, or while an acoustic output of the digital assistant is being effected. In a step 250, the output can be provided depending on the processed acoustic scanning of the person 110. A vehicle function, in particular a driving function of the vehicle 105, can likewise be controlled in response to the acoustic input from the person 110 in the step 250. In this case, the second emotion conveyed by the representation of the digital assistant that is visible on the output device 120 can assist the interaction with the person 110.

Not all of the illustrated steps 205 to 250 of the method 200 need proceed in the order shown. Some of the steps can also be omitted. By way of example, in one embodiment, it is possible to make a transition from the step 215 directly to the step 245 by virtue of the optical representation of the digital assistant being controlled to directly reflect indicators from facial expressions or gestural indicators to the first emotion. This can be advantageous in particular for reflecting the first emotion of the person 110 even before an input from the person 110 has concluded. It goes without saying that the different embodiments can also be converted into one another such that, for example, after the linguistic input has been recognized, a transition is made to the more complex embodiment of emotional assistance as described above.

Figure 3:
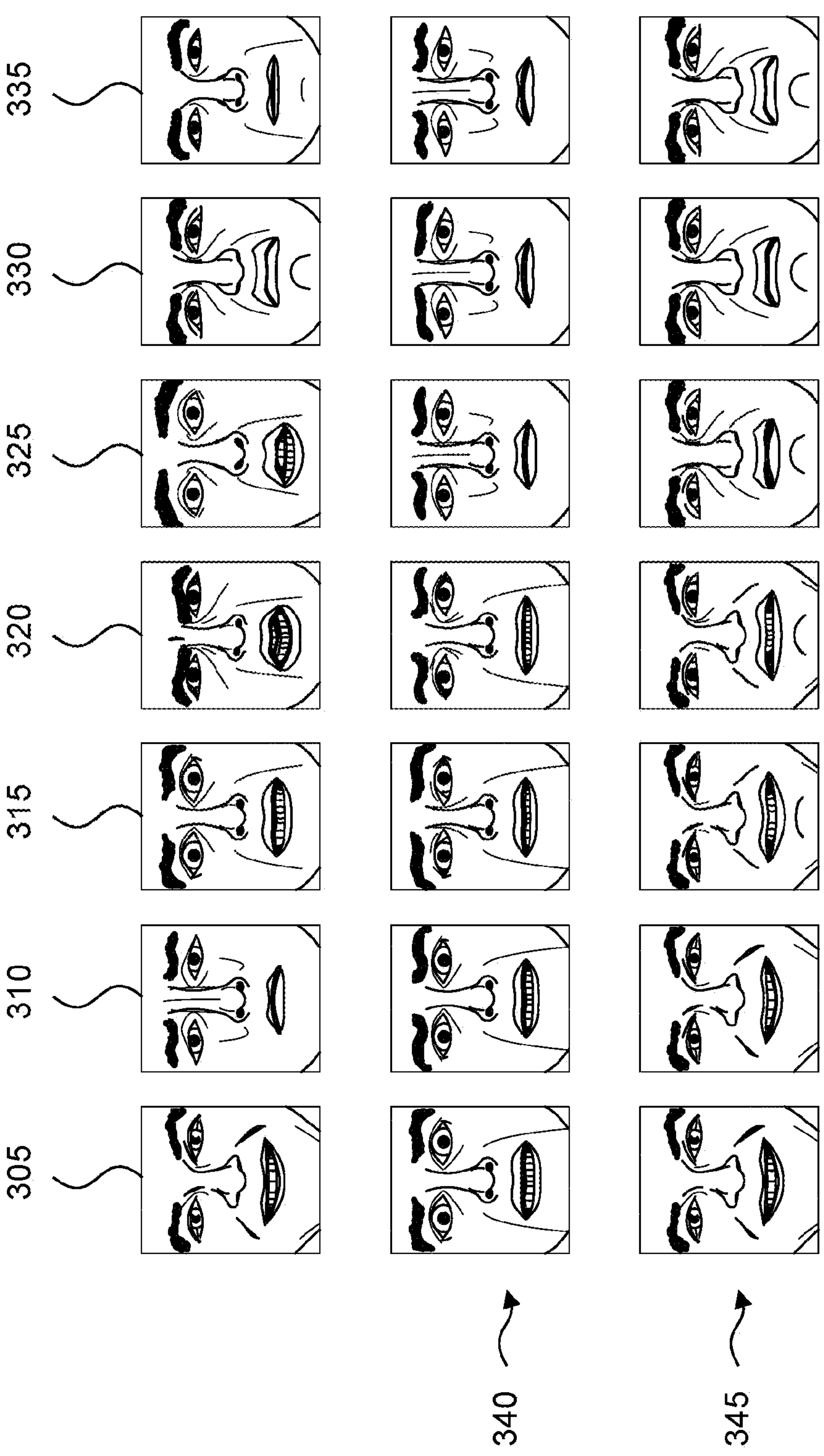
FIG. 3 illustrates exemplary expressions of emotions on a face of a person.

FIG. 3 shows exemplary expressions of emotions on a face of a person 110. The illustrated expressions may be observed on the person 110 or taken as a basis for an output of the graphical representation of the digital assistant on the output device 120.

An upper row illustrates expressions of faces that can each be assigned to an emotion. These include a happy expression 305, a sad expression 310, an anxious expression 315, an annoyed expression 320, a surprised expression 325, a repelled expression 330 and a neutral expression 335. The neutral expression 335 can be used as an example of a normal emotion described herein.

In order to assign an expression 305 to 335 to an emotion, individual elements of the presented face can be analyzed. By way of example, a shape, a degree of opening or a contortion of the mouth can be observed. In a similar manner, eyes, eyebrows, or cheek musculature can be considered in terms of size, position, activity, etc. Features determined in such a way can be compared with predetermined combinations of features. An emotion can be assigned to a combination, which emotion can thus be recognized.

An emotion can be expressed by the person 110 or the digital assistant in different gradual gradations. The gradations can be arranged on a scale, such that they are ordered according to ascending or descending strength of the emotion. It is also possible to form a scale or a progression between two different emotions.

The second row of the illustration in FIG. 3 illustrates a first progression 340 of emotions that are gradually gradated from fear (far left) to sadness (far right). In a similar manner, the third row in FIG. 3 illustrates a second progression 345 of emotions that are gradually gradated from happiness (far left) to disgust (far right).

It becomes clear how an emotion can be recognized in terms of type and strength on the basis of an optical scanning of a face or, conversely, can be expressed by a visual representation of a face for the digital assistant.

The emotions and transitions illustrated in FIG. 3 should be regarded as purely by way of example here.

Figure 4:
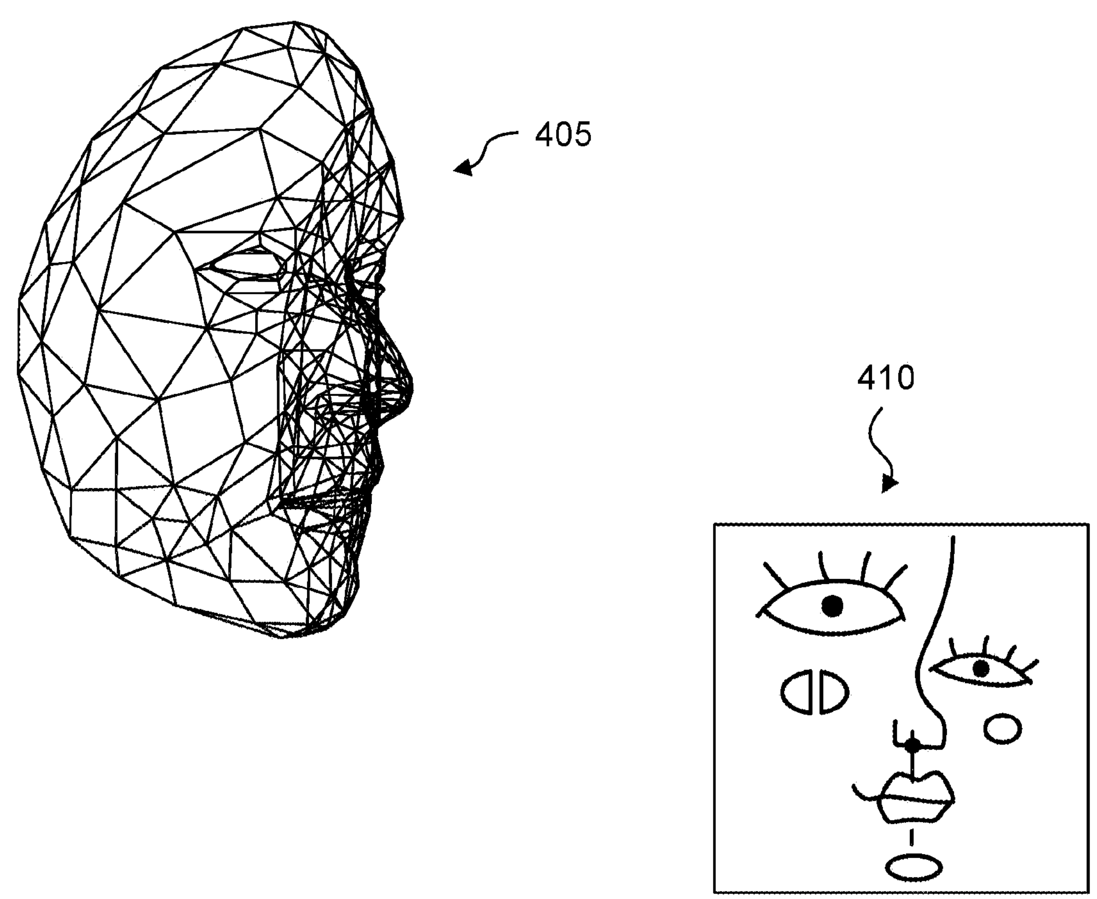
FIG. 4 illustrates exemplary visual representations of emotions.
Figure 4:
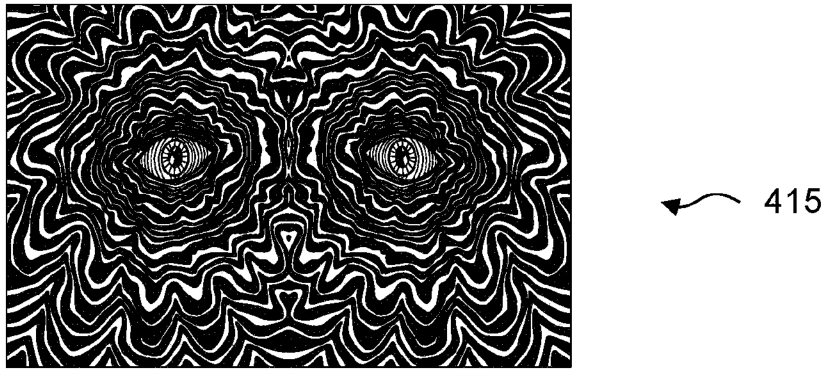

FIG. 4 shows exemplary visual representations of emotions. Each of the representations can be used as a visual representation of the digital assistant on the output device 120.

A first representation 405 concerns a three-dimensional representation of a face. A wire-frame model for representing the face has been chosen here by way of example. The model can be arbitrarily refined and provided with a texture, in particular. The output device 120 can provide a two-dimensional or three-dimensional visual representation. A different and in particular larger section of a figure can also be chosen instead of a face. This figure can be humanoid or it is possible to choose some other manner of expression for the digital assistant.

A second representation 410 shows a stylized face, wherein elements such as a nose, the eyes, cheeks, a mouth or a chin are represented in simplified, reduced, overdrawn or symbolic forms. A shape, size or arrangement of the elements need not follow a customary human anatomy and can also be used for expressing an emotion.

A third representation 415 shows an abstract face, which in the present case comprises realistic elements in the form of the eyes and unrealistic elements in the form of black and white boundaries surrounding the eyes. In a region between the eyes, the boundaries form patterns that can be perceived as nose or mouth.

In a corresponding manner, even more abstract patterns or effects can also be used to convey the impression of a person or the personality of the digital assistant. In all cases, the representations 405 to 415 can be controlled in such a way that they express a predetermined emotion. It should be noted that the representation need not necessarily be based on a face. In other embodiments, for example, an animal, a mythical creature, an animated object or a comic figure can be used for representing the digital assistant.

REFERENCE SIGNS

100 system
105 vehicle
110 person
115 input device
120 output device
125 processing device
130 data memory
135 interface
200 system
205 record interior
210 capture person
215 optically scan person
220 capture acoustic input
225 determine first emotion
230 processing of optical scan
235 processing of acoustic scan
240 determine second emotion
245 control interactive digital assistant
250 output of the digital assistant, control vehicle function
305 happy emotion
310 sad emotion
315 anxious emotion
320 annoyed emotion
325 surprised emotion
330 repelled emotion
335 neutral emotion
340 first progression
345 second progression
405 first representation
410 second representation
415 third representation

The invention claimed is:

1. A system for controlling a digital assistant on board a vehicle for interacting with a person by way of speech, the system comprising:
- an input device configured to optically scan the person;
- an output device configured to output an optical impression of the assistant; and
- a processing device configured to control the digital assistant such that the digital assistant expresses an emotion depending on an emotion of the person,
- wherein the processing device is configured:
  - to determine a first emotion of the person based on the optical scanning;
  - to determine a second emotion based on the first emotion; and
  - to control the digital assistant to express the second emotion.

2. The system according to claim 1, wherein the emotion of the digital assistant follows the emotion of the person.

3. The system according to claim 1, wherein the digital assistant has a face and the processing device is configured to control the digital assistant such that an expression of the face of the digital assistant follows an expression of a face of the person.

4. The system according to claim 1, wherein the digital assistant has limbs and the processing device is configured to control the digital assistant such that the limbs of the digital assistant follow a pose or a gesture of limbs of the person.

5. The system according to claim 1, wherein the processing device is configured to determine a difference between the first emotion and a predetermined normal emotion on a predetermined scale and to determine the second emotion such that the second emotion follows the first emotion on the scale only as far as a predetermined distance from the normal emotion.

6. The system according to claim 5, wherein the second emotion complements the first emotion on the predetermined scale.

7. The system according to claim 1, wherein the processing device is configured to define a predetermined emotion as the second emotion when the determination of the first emotion is unsuccessful or is not unambiguous.

8. The system according to claim 1, further comprising:

an interface to an interior lighting system of the vehicle, wherein the processing device is configured to control the interior lighting system such that the interior lighting system supports the second emotion.

9. The system according to claim 1, wherein the digital assistant is configured to recognize a linguistic utterance of the person and to provide a spoken output depending on the utterance.

10. The system according to claim 9, wherein the utterance concerns a vehicle state of the vehicle.

11. The system according to claim 9, wherein the digital assistant is configured to control a vehicle function in response to the utterance.

12. A vehicle comprising the system according to claim 1.

13. A method for controlling a digital assistant on board a vehicle for interacting with a person by means of speech, the method comprising:

optically scanning the person;

outputting an optical impression of the digital assistant; and controlling the digital assistant to express an emotion depending on an emotion of the person, wherein controlling the digital assistant comprises:

determining a first emotion of the person based on the optical scanning;

determining a second emotion based on the first emotion; and controlling the digital assistant to express the second emotion.

* * * * *